(12) United States Patent
Shizukuishi

(10) Patent No.: US 7,391,967 B2
(45) Date of Patent: Jun. 24, 2008

(54) CAMERA SYSTEM

(75) Inventor: Makoto Shizukuishi, Miyagi-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/152,673

(22) Filed: May 23, 2002

(65) Prior Publication Data

US 2002/0176711 A1   Nov. 28, 2002

(30) Foreign Application Priority Data

May 23, 2001   (JP) ............... 2001-153882

(51) Int. Cl.
*G03B 17/24* (2006.01)
*G03B 7/00* (2006.01)
*H04N 5/76* (2006.01)
*H04N 5/225* (2006.01)

(52) U.S. Cl. .................. 396/321; 396/56; 396/211; 396/300; 396/311; 396/320; 348/207.2; 348/211.2; 348/231.2; 348/231.7

(58) Field of Classification Search ............... 396/320, 396/319, 310, 311, 321, 315, 316, 317, 211, 396/300; 348/333.02, 372, 231.1, 231.2, 348/231.3, 211.99, 211.1, 211.2, 211.3, 207.2, 348/552, 333.05; 358/442, 448, 501, 530; 386/46, 117
See application file for complete search history.

(56) References Cited

U.S. PATENT DOCUMENTS

| | | | | |
|---|---|---|---|---|
| 5,036,344 A * | 7/1991 | Inoue et al. | .................. | 396/211 |
| 5,140,361 A * | 8/1992 | Ishikawa et al. | ............ | 396/211 |
| 5,633,678 A * | 5/1997 | Parulski et al. | ........... | 348/231.5 |
| 5,893,037 A * | 4/1999 | Reele et al. | ............. | 455/556.1 |
| 6,018,631 A * | 1/2000 | Taniguchi et al. | ............. | 396/79 |
| 6,026,245 A * | 2/2000 | Fujii et al. | .................... | 396/85 |
| 6,047,140 A * | 4/2000 | Yoshikawa | .................. | 396/310 |
| 6,081,350 A * | 6/2000 | Aizawa et al. | .............. | 358/468 |
| 6,173,119 B1 * | 1/2001 | Manico et al. | ................. | 396/6 |
| 6,324,521 B1 * | 11/2001 | Shiota et al. | .................. | 705/27 |

(Continued)

FOREIGN PATENT DOCUMENTS

JP    10-226139    8/1998

(Continued)

OTHER PUBLICATIONS

Translation of detailed description of Makishima, Sugio (JP 2001-128113).*

(Continued)

*Primary Examiner*—Rochelle-Ann Blackman
(74) *Attorney, Agent, or Firm*—Birch, Stewart, Kolasch & Birch, LLP

(57) ABSTRACT

The present invention provides a camera system, which can simplify an ordering procedure. An IC memory comprising a contactless interface is mounted on a camera, or an image recording medium, such as memory card or film. In a case where a customer has carried the camera to a photo lab, image data is read out of the memory card or is acquired by reading the developed film, by an image data acquisition component. Moreover, individual information, order information, account information, and the like, are read out of the IC memory over wireless communication by a reader and writer and are affixed to the image data, whereupon the resulting image data is stored in a database.

35 Claims, 11 Drawing Sheets

U.S. PATENT DOCUMENTS

| | | | |
|---|---|---|---|
| 7,075,572 B2 * | 7/2006 | Kinjo | 348/231.99 |
| 2001/0016829 A1 * | 8/2001 | Toshikage et al. | 705/26 |
| 2001/0042149 A1 * | 11/2001 | Ito et al. | 710/102 |
| 2002/0012048 A1 * | 1/2002 | Yamagishi | 348/207 |
| 2004/0174435 A1 * | 9/2004 | Kondoh | 348/211.99 |

FOREIGN PATENT DOCUMENTS

| | | |
|---|---|---|
| JP | 10-308088 | 11/1998 |
| JP | 11-154218 | 6/1999 |
| JP | 11-168684 | 6/1999 |
| JP | 2000-174941 | 6/2000 |
| JP | 2000-295551 | 10/2000 |
| JP | 2001-042442 | 2/2001 |
| JP | 2001061125 A * | 3/2001 |
| JP | 2001128113 A * | 5/2001 |

OTHER PUBLICATIONS http://ww.digicamhistory.com/1991.html pp. 1-11, p. 4—Fuji DS-100-1991. Digital memory card camera. Popular Photography, Dec. 1991. p. 111.*

* cited by examiner

FIG.6
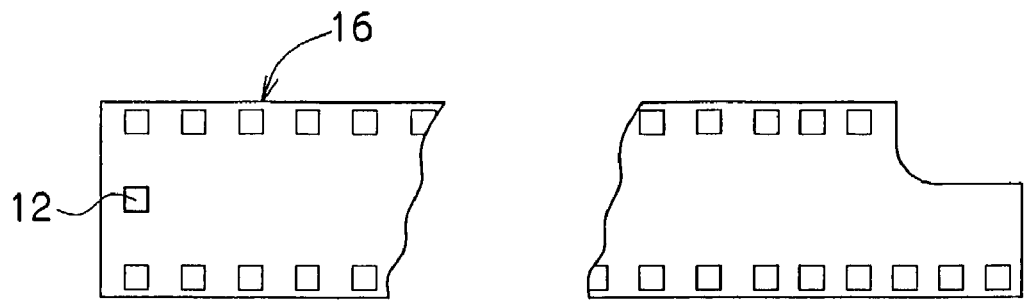
FIG.7A  FIG.7B
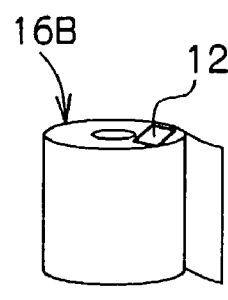 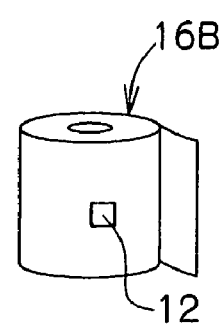
FIG.8A  FIG.8B
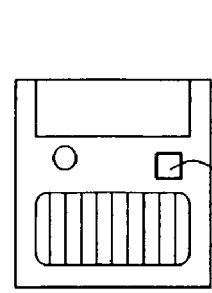 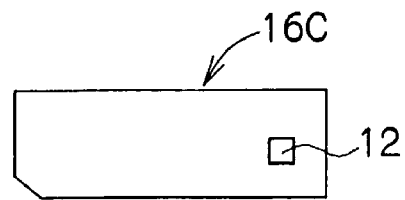

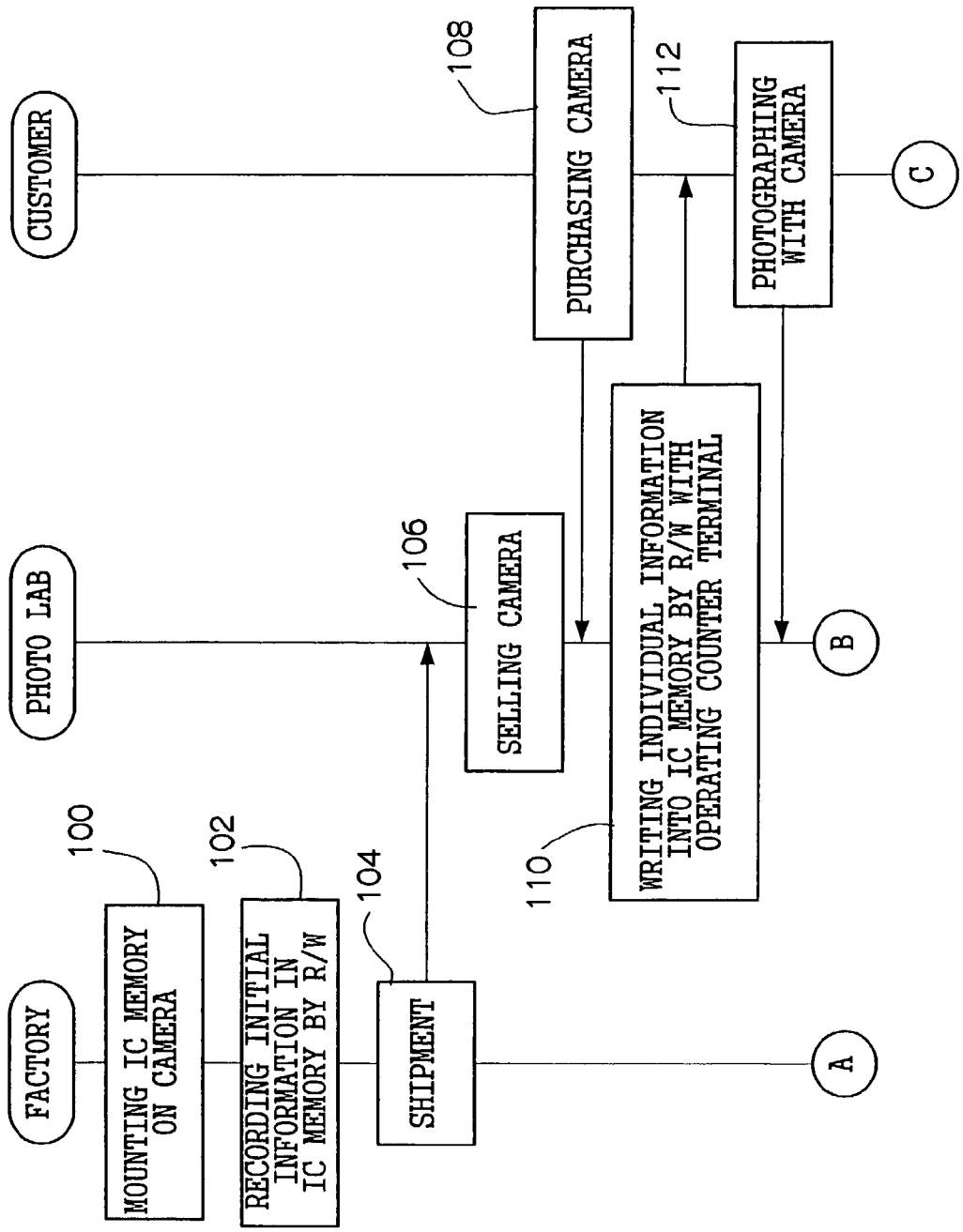

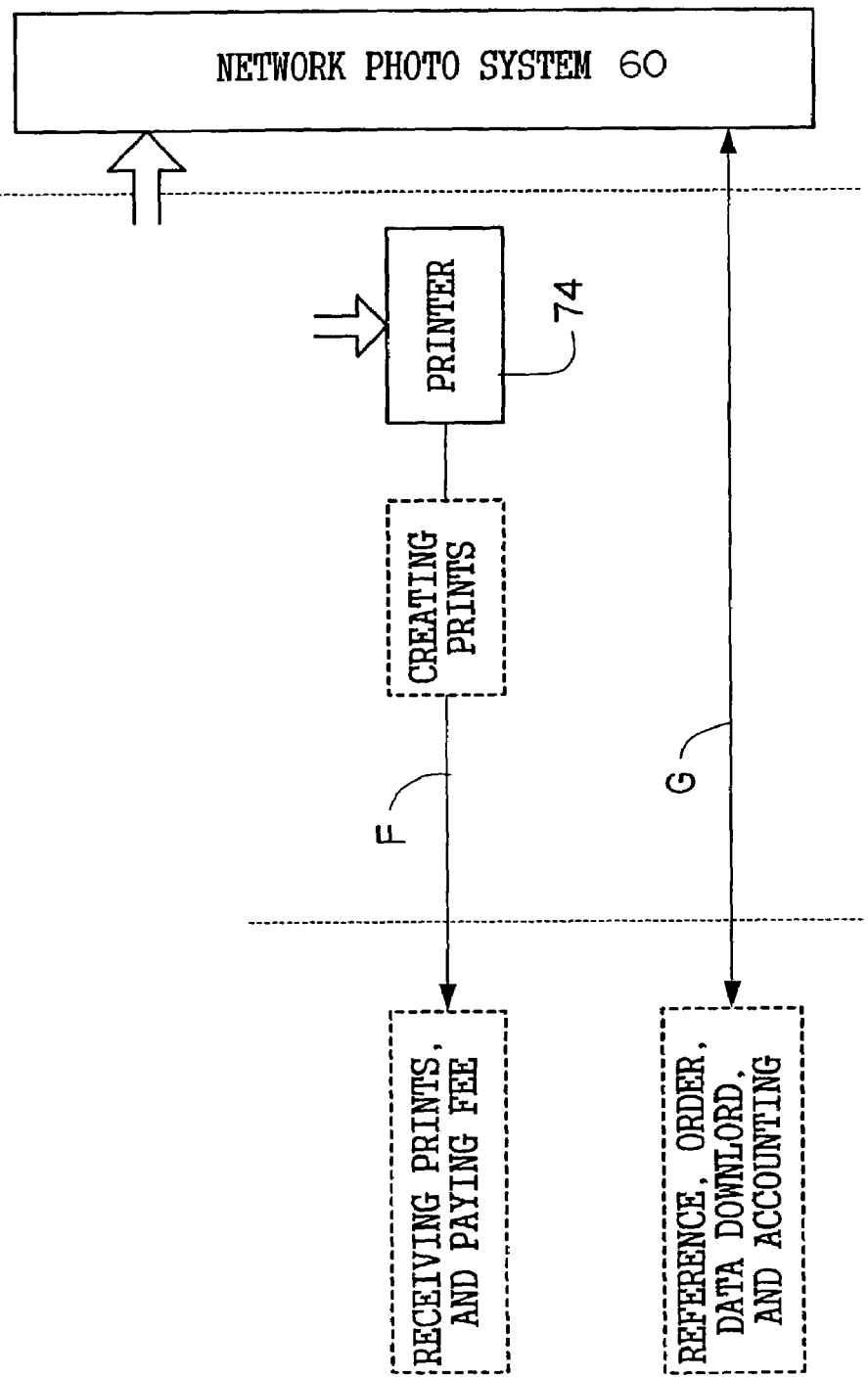

CAMERA SYSTEM

BACKGROUND OF THE INVENTION

1. Field of the Invention

The present invention relates to a camera system, a camera device, an image recording medium, a printing system and a server apparatus. More particularly, it relates to a camera system, which photographs a subject with a camera and records image data obtained by this photographing onto an image recording medium, and to the camera, the image recording material, a printing system and a server apparatus, which are used with the camera system.

2. Description of the Related Art

Heretofore, cameras (hereinafter, termed "silver halide cameras") which employ a silver halide photographic film (hereinafter, simply termed "film") as an image recording medium, have been extensively used for photographing. In recent years, owing to the development of electronic imaging and digital signal processing devices based on great advances in semiconductor IC technology, wide bandwidth data compression technology, high-speed large-capacity communication technology, etc., a so-called "digital still camera" (hereinafter, referred to as, "DSC"), whose image recording medium is a memory for recording electronic image data, is rapidly coming into wide use. Since the DSC acquires a photographic image in the form of the digital data, it exhibits an excellent affinity with various types of digital equipment and the Internet, and it is utilized especially as a peripheral equipment for inputting the photographic image into a personal computer (hereinafter, referred to as a, "PC").

Common to both the silver halide camera and the DSC is that there are the images of photographs taken need to be printed and enjoyed and further kept them in albums. In case of the silver halide camera, print services, which offer integrated firm developing and printing, are already established at photo labs (or camera stores, photograph shops, and the like) in various places, and it is generally widespread.

However, in case of the DSC, since it has spread as the peripheral equipment of a PC, the photographic image is often printed using a color printer connected to the PC, and the image quality of the printed photographic image is greatly affected by the performance of the printer and by the type of paper used. For this reason, a print service has recently been offered, which reads out the photographic image from a memory for recording the photographic images taken by the DSC, for example, a memory card such as Smart Media card, MEMORY STICK, COMPACT FLASH or SD card, and which a print of high image quality, as in the case of the silver halide camera. Accordingly, general users desire improvements in the convenience and the quality of the print service for cases when the silver halide camera or the DSC is utilized.

Meanwhile, such a print service, which provide services via a network, such as, a network photo system disclosed in Japanese Patent Laid-Open (JP-A) No. 11-154218, has been proposed owing to the recent widespread use of the Internet. More specifically, a server computer, which has a film scanner, a printer, a large-capacity recording disk system, and the like installed therein is disposed in a major collection/delivery photo lab (large photo lab) or a small-scale photo lab (mini photo lab) for developing and printing a film, and the image server is accessed through the network by the general user, which image server offers various services such as reception of an order for print a photographic image, attachment of the photographic image to an electronic mail, and the downloading the photographic image (image data) and the like.

In the network photo system, however, information for identifying individual customers and order information items, which indicate contents of orders, need to be managed together with photographic images. For example, in the case of the silver halide camera, when the customer carrying the exposed film requests printing at a photo lab, he/she must fill in this information by hand, which is bothersome. Besides, when placing order for additional printing (for an additional copy), the customer must carry the developed film to the photo lab and similarly enter the individual information and the order information by hand.

Even in the case of the DSC, when the customer has carried a memory card including the images of photographs taken, to the photo lab, he/she is required to enter the individual information and order information by hand as in the case of the silver halide camera. That is, with the DSC, even though the photographic image is electronically recorded, the individual information or the order information is not electronically integrated with the data of the photographic image, and the user cannot obtain convenience higher than that of the print service for the silver halide camera.

SUMMARY OF THE INVENTION

The present invention has been made in order to resolve the above problems, and objects thereof are to provide a camera system, a camera device, an image recording medium, a printing system and a server apparatus which can simplify an ordering procedure.

In order to accomplish the object, a first aspect of the present invention provides a camera system wherein a subject is photographed by a camera, and an image of the subject is recorded in an image recording medium, characterized by comprising an information recording component, which is mounted on the camera or the image recording medium, and into and out of which information other than the image can be written and read, on the basis of an external signal.

According to the first aspect of the present invention, the camera device or the image recording medium is provided with the information recording component, which can read/write the information other than the image. The image recording medium may be a silver halide film, such as 135 size film or APS film, or a memory, such as a semiconductor memory, ferroelectric memory, magnetic memory or optical recording memory (MO, CD, DVD or the like). In other words, the camera device may be a silver halide camera or a DSC.

The information recording component is adapted to, based on the external signal, external write the information from outside or reads out the information to the outside. The information to be read, written at this time includes, for example, manufacturer information such as the product no., serial no. and reference time of the camera or the film; identification information such as order information, account information and individual information for use in placing an order for printing the image, and other additional information such as a simple comment, a logo mark or an illustration to be printed in addition to the image. Thus, when placing the order for printing, for example, the identification information items such as order information, account information and individual information need not be entered by hand, as in the prior art, and the information (identification information) written in the information recording component may merely be read out, so that order forms, slips and the like become unnecessary, permitting paperless operations, and reducing the task of a clerk or a customer.

In order to transmit/receive and record large quantities of data and to prevent the data from being altered or forged, the information recording component can be an IC memory chip.

In addition, the information recording component can include a contactless communication component, which communicates with the exterior in a contactless condition. Thus, the information recording component can read/write the information using the communications without contacting the exterior. Therefore, this embodiment is not affected by a contact surface as a contact system, and can stably read/write the information and is easily connected with the camera or the image recording medium.

Moreover, when the contactless communication component and the memory chip are integrated on the same chip, wiring for connecting them becomes unnecessary, and a space required for mounting the information recording component on the camera or the image recording medium can be made smaller.

In order to read from the information recording component or write into it, the contactless communication component may communicate with a dedicated external reader and writer, or it may communicate with a portable telephone.

The IC memory chip can update recorded contents and be repeatedly used when a memory cell thereof is a semiconductor nonvolatile memory, a ferroelectric memory or a magnetic memory. The "magnetic memory" mentioned here indicates a memory, such as MRAM (Magnetic Random Access Memory), which, unlike a hard disk or CD, has no mechanical driving parts.

Moreover, when the information recording component is removably mounted on the camera device or the information recording medium, it can be removed and reused. Further, when the customer is the same, for example, the labor of writing the same individual information into every camera device or every image recording medium can be omitted.

A second aspect of the present invention is a camera device for photographing a subject, that comprises an information recording component, which can read/write information other than an image of the photographed subject based on an external signal.

According to the second aspect of the present invention, the camera device such as a silver halide camera or a DSC is provided with the information recording component, and the information recording component can read/write the information (manufacturer information, identification information, additional information, etc.) other than the image of the photographed subject on the basis of the external signal. That is, the information from an external section can be written into the information recording component and can be externally read out of the information recording component to an external section. Therefore, for example, identification information items such as order information, account information and individual information need not be entered by hand as in the prior art, and the information (identification information) written in the information recording component may merely be read out, so that an order form, a slip or the like is dispensed with to permit paperless operations, and that the task of a clerk or a customer can be reduced.

As in the aforementioned camera system, the information recording component may be an IC memory chip or may include a contactless communication component, the IC memory chip and the contactless communication component may be integrated on the same chip, and the IC memory chip may have at least one of a semiconductor nonvolatile memory, a ferroelectric memory and a magnetic memory as its memory cell.

A third aspect of the present invention is an image recording medium, which is used in a camera device that photographs a subject, and which records an image of the photographed subject, and comprises an information recording component, which can read/write information other than the image of the photographed subject on the basis of an external signal.

According to the third aspect of the present invention, the image recording medium such as a silver halide film or a memory is provided with the information recording component, and the information recording component can read/write the information (manufacturer information, identification information, additional information, etc.) other than the image of the photographed subject on the basis of the external signal. That is, the identification information from an external section can be written into the information recording component, and the information can be read out of the information recording component to the external section. Therefore, when placing an order for printing, for example, the identification information items such as order information, account information and individual information need not be entered by hand as in the prior art, and the information (identification information) written in the information recording component may merely be read out, so that an order blank, a slip or the like is dispensed with to permit paperless operations, and that the task of a clerk or a customer can be reduced.

As in the foregoing camera system, the information recording component may be an IC memory chip or may include a contactless communication component, the IC memory chip and the contactless communication component may be integrated on the same chip, and the IC memory chip may have at least one of semiconductor nonvolatile memory, a ferroelectric memory and a magnetic memory as its memory cell.

A fourth aspect of the present invention is a printing system having a printer for printing the image photographed by the camera system of any of the first through third aspect, which comprises: a readout component, which reads out the information written in the information recording component; an image acquisition component, which acquires the image data from the image recording medium; and a storage component, which stores the image data acquired by the image acquisition component, together with the information read out of the information recording component by the readout component.

According to the fourth aspect of the present invention, the information items (manufacturer information, identification information, additional information, etc.) written in the information recording component and for use when placing an order for printing are read out by the readout component, and they are stored in the storage component together with the image data acquired from the image recording medium by the image acquisition component. Thus, when placing the order for printing the image, for example, the identification information items such as order information, account information and individual information need not be entered by hand as in the prior art, and the information (identification information) written in the information recording component may merely be read out, so that an order form, a slip or the like is dispensed with to permit paperless operations, and that the task of a clerk or a customer can be reduced.

When the image data is analog data, the analog data is converted into digital data and stored in the storage component. Thus, even in a case where the image data is analog data, as when the image data is acquired from a silver halide film, the image data is digitized and then stored in the storage component, and thus, can be easily managed together with the image data acquired as digital data from the memory of a DSC.

Besides, when the image data is converted into data of identical standard irrespective of a type of the camera device and then stored in the storage component, they can be easily managed without differentiating the type of the camera device, such as a silver halide camera or a DSC.

The image data is subjected to data compression and then stored in the storage component, a required memory capacity becomes small, and the storage component is permitted to store a large quantity of image data. Moreover, in a case where the image data stored in the storage component is transferred through, for example, a network, a network traffic volume can be made small. When the data is compressed according to, for example, the JPEG standard, a compression rate is high, and the image data can be easily handled because the image data format is a general standard.

Moreover, in a case where the information contains information which indicates at least one of a type of the camera device, a type of the image recording medium, and a photographing condition, and where the printer sets a print output condition for printing the image, on the basis of the information, which indicates at least one of the type of the camera device, the type of the image recording medium, and the photographing condition, the image can be always printed under the optimum print conditions, and a printed result of high image quality can be obtained.

A fifth aspect of the present invention is a server apparatus connected to a network to which the printing system of the fourth aspect is connected. This aspect receives order information, which places an order for printing the image and is transmitted from a terminal device to the server apparatus through the network, and by transmitting instruction information, which instructs the printing system to execute the printing, on the basis of the received order information.

According to the fifth aspect of the present invention, when the server apparatus receives the order information from the terminal device through the network, it transmits the instruction information for giving the instruction to execute the printing, to the printing system on the basis of the order information, and the printing is executed by the printing system. Thus, a customer can place the order for printing the image, without going to a photo lab, camera stores, photograph shops, or the like, where the printing system is installed, or without carrying the image recording medium to the photo lab. Moreover, since the image data and the information items, such as identification information, read out of the information recording component are managed collectively, the corresponding manage of the image data and the customers is also easy.

When the information contains information capable of transmitting a message to a printing orderer and where the message is transmitted to the printing orderer by the use of the information capable of the transmission, the printing orderer can be informed of, for example, acknowledgment of the acceptance of the order, date of the receipt of prints, and estimated charges.

As stated above, the present invention has the excellent advantage that the procedure of ordering steps can be simplified.

BRIEF DESCRIPTION OF THE DRAWINGS

FIG. 6 views an example wherein the IC memory is mounted on the base of a film;

FIG. 7A views an example wherein the IC memory is mounted on a side surface of an housing member for the base of a film;

FIG. 7B views an example wherein the IC memory is mounted on a peripheral surface of the housing member for the base of a film;

FIG. 8A views an example wherein the IC memory 12 is mounted on a card-shaped memory (Smart Media);

FIG. 8B views an example wherein the IC memory 12 is mounted on a stick-shaped memory card (Memory Stick);

FIG. 10A views the job flow of a factory, a photo lab and a customer to explain the operation of the whole photo system;

FIG. 12B is a conceptual diagram for explaining steps from the customer carrying the camera subjected to photographing, to the photo lab until the camera is linked to the network photo system.

DESCRIPTION OF THE PREFERRED EMBODIMENTS

Now, embodiments of the present invention will be described in detail with reference to the drawings.

[Schematic Construction of Camera System]

Figure 1:
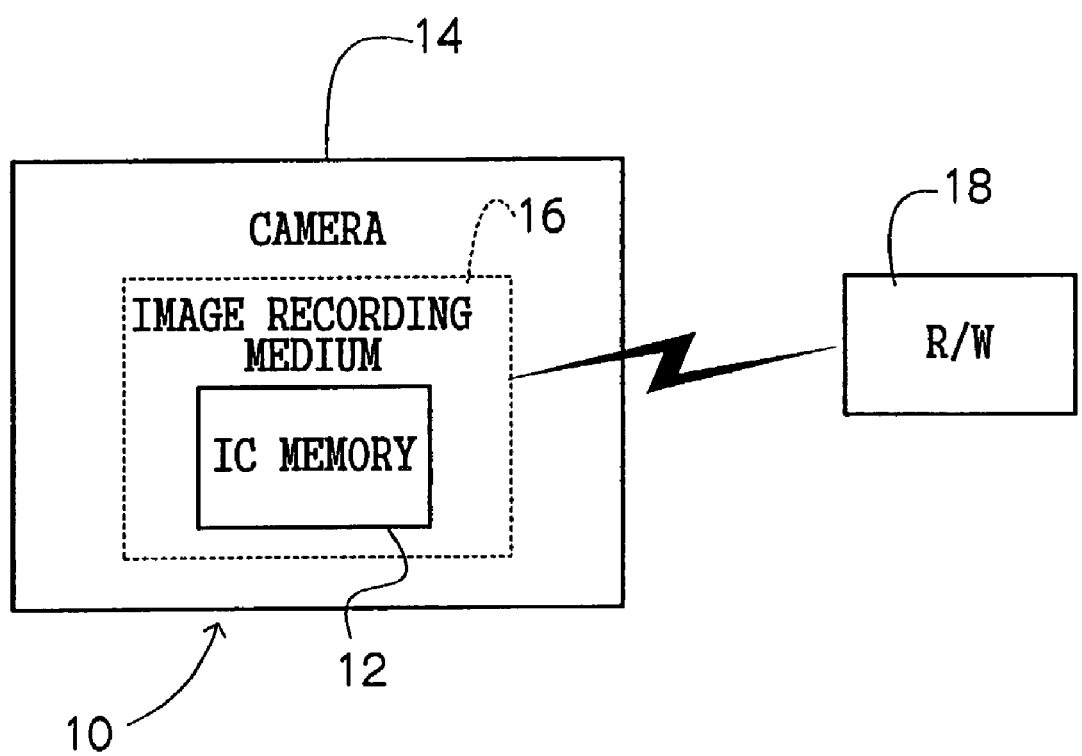
FIG. 1 is a block diagram showing a schematic construction of a camera system according to an embodiment of the present invention.

As shown in FIG. 1, a camera system 10, to which the present invention is applied, is constructed so that an IC memory 12 for recording various information, such as individual information and order information, is mounted as an information recording component on a camera 14 such as silver halide camera or DSC, or on an image recording medium 16 such as a film which optically records photographed images or a memory which electronically records images. The recorded information of the IC memory 12 can be used in a network photo system, which will be explained later.

Since the structure of the camera 14 and the image recording medium 16 are conventional, detailed description thereof shall be omitted.

The IC memory 12 employs as its interface with an external equipment, a so-called "contactless interface", which uses wireless communication (for example, the international standard (ISO/IEC14443) for a contactless IC card, the Bluetooth standard, or the IrDA standard). The information is written into or read out of the IC memory 12 with wireless communication by a reader and writer (R/W) 18, which is a readout component. That is, the transmission/reception of the data between the IC memory 12 and the R/W 18 is performed with the wireless communication in a contactless state.

In addition, the present invention is not limited to the IC memory 12, but a ferroelectric memory, a magnetic memory (MRAM), an optical recording memory, etc. may be employed as long as it can record information. Moreover, the data transmission/reception is not restricted to the contactless system based on the wireless communication, but it may well be performed by a contact system, wherein the IC memory chip 22 is in physical contact exchanges the data with the R/W 18.

As compared with a recording medium of barcode or magnetic card type, however, the IC memory 12 is more suitable for the transmission/reception and recording of large amounts of data, is difficult to alter or forge, and is more excellent in the secrecy of the recorded data. It is therefore favorable to employ the IC memory 12 as in this embodiment. Moreover, in comparison to the contact system, the contactless system can transmit/receive data without being influenced by its contact conditions, can be mounted easily without being restricted by the shape of the camera 14 or image recording medium 16 itself, and can reduce the cost of a contact member etc. It is therefore favorable to employ the contactless system as in this embodiment.

A contactless system IC memory, which is, for example, a "proximity type" memory having the following specifications may be applied.

Signal frequency: 13.56 MHz
Modulation System: ASK (Amplitude Shift Keying)
Communication Rate: 106 kb/sec-847 kb/sec
Communication Distance: about 1 cm-about 20 cm
Number of Coil turns: 1-10 turns
Battery: unnecessary
International Standard: ISO/IEC14443

[Detailed Construction of IC Memory]

Figure 2:
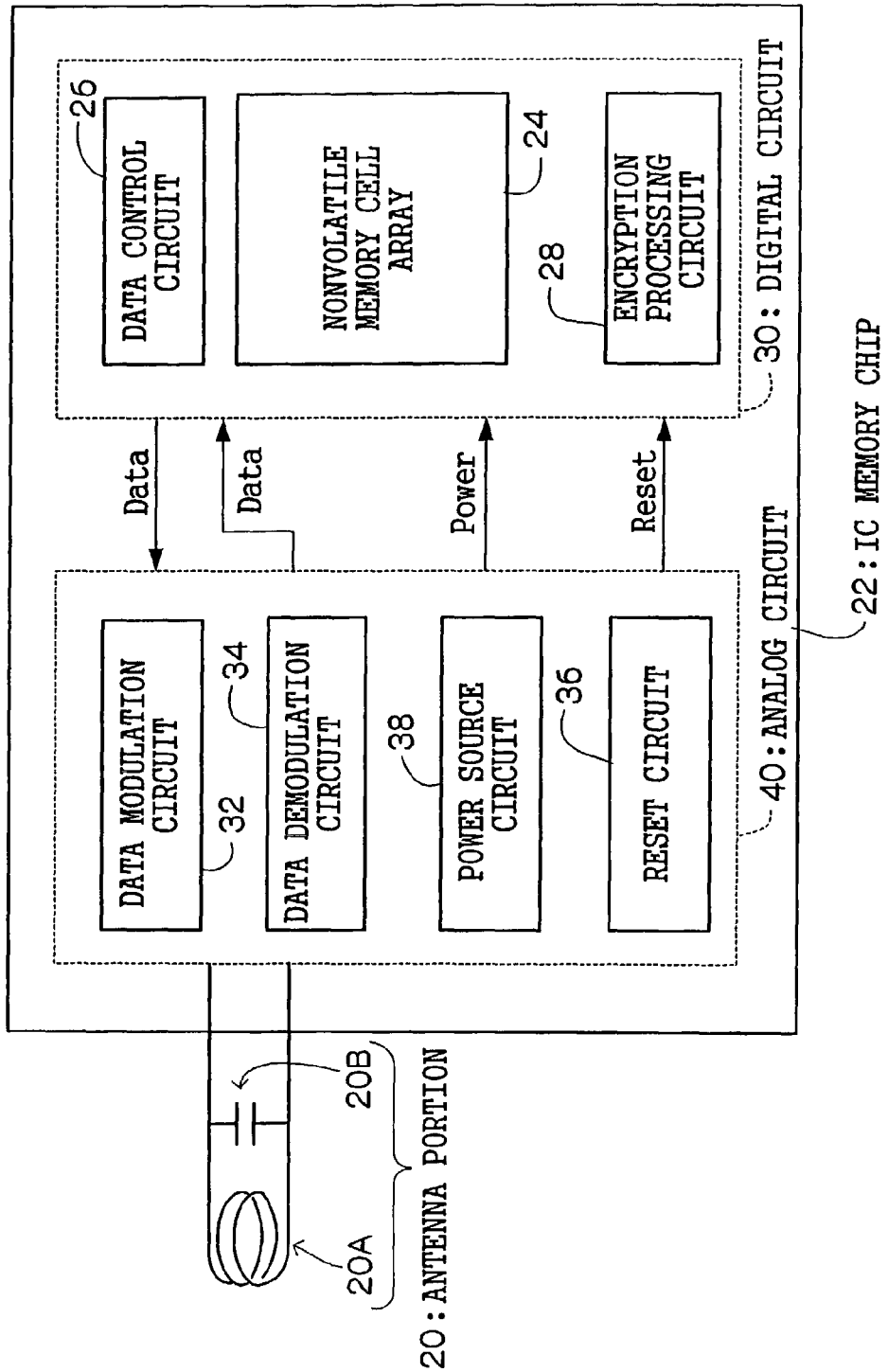
FIG. 2 is a diagram showing a detailed construction of an IC memory chip (22) and an antenna.

Next, the detailed construction of the IC memory 12, which transmits/receives data by wireless communication will be described with reference to FIG. 2. As shown in FIG. 2, the IC memory 12 is constructed of an antenna 20, as a contactless communication component, and an IC memory chip 22. The antenna 20 includes an antenna coil 20A and a capacitor 20B, and serves to realize the data transmission/reception to and from the R/W 18 in accordance with the contactless system. Incidentally, the antenna 20 may be externally attached to the IC memory chip 22, or it may be formed on the same IC memory chip 22 (on chipped).

The antenna 20 functions as a contactless external interface by converting an electric signal into an electromagnetic wave and outputs the electromagnetic wave to the exterior, and by receiving an external electromagnetic wave and converting the electromagnetic wave into an electric signal.

The IC memory chip 22 includes a digital circuit 30, which consists of a nonvolatile memory cell array 24, a data control circuit 26 and a code processing circuit 28; and an analog circuit 40, which comprises a data modulation circuit 32, a data demodulation circuit 34, a reset circuit 36 and a power source circuit 38. A CPU can also be built in the digital circuit 30, so as to execute more complicated computing.

A semiconductor nonvolatile memory (EEPROM or flash memory) is a specific example of the nonvolatile memory cell array 24, and various data are recorded in this nonvolatile memory cell array 24. Herein, the nonvolatile memory cell array 24 which can be employed has a recordable data capacity on the order of 1 kbyte-100 kbytes though the capacity depends also on the data to-be-recorded.

The reasons for making the IC memory 12 a rewritable nonvolatile IC memory of contactless by employing the nonvolatile memory cell array 24 are that the recorded data can be updated and be repeatedly used, and that, since the secrecy of information is high, the IC memory is superior for protecting individual information and privacy. In addition to the semiconductor nonvolatile memory (EEPROM or flash memory), a ferroelectric memory (FRAM) or a magnetic memory (MRAM) may be used to obtain similar advantages.

The data control circuit 26 controls the read/writing of data from/into the nonvolatile memory cell array 24, and the data to be read/written is encoded or decoded by the code processing circuit 28 as needed.

The data modulation circuit 32 generates a modulation signal based on the data read out of the nonvolatile memory cell array 24. An electromagnetic wave modulated on the basis of the modulation signal is transmitted from the antenna 20 toward the R/W 18. The data demodulation circuit 34 demodulates the signal received from the R/W 18 through the antenna 20 into data. The demodulated data is recorded in the nonvolatile memory cell array 24 by the controlling of the data control circuit 26.

When a signal instructive of reset has been received in the antenna 20, the reset circuit 36 resets the internal circuits of the analog circuit 40, and it resets the internal circuits of the digital circuit 30 by delivering a reset signal to the digital circuit 30. That is, the reset circuit 36 resets all the internal circuits of the whole IC memory 12.

The power source circuit 38 generates electric power from electromagnetic waves by using a smoothing circuit, and the power is utilized in the analog circuit 40 and is also fed to the digital circuit 30. That is, the power source circuit 38 can generate the electric power of the whole IC memory 12, so that the IC memory 12 can operate alone without power feed from an external battery or the like.

[Mounting Examples of IC Memory]

Next, FIG. 3A through FIG. 8B show mounting examples of the IC memory 12.

Figure 3A:
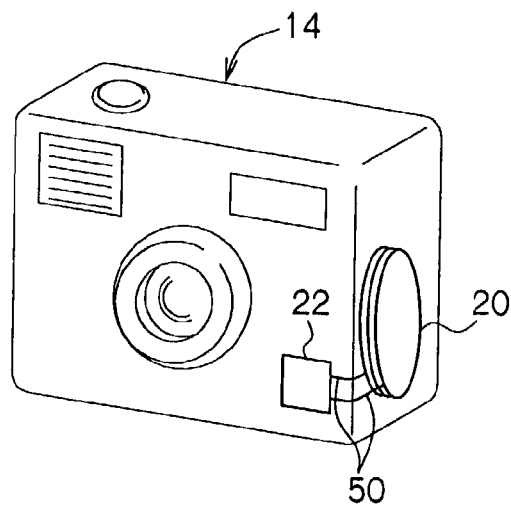
FIG. 3A is an external view of a camera in an example wherein the IC memory chip (22) and an antenna (50, 20) formed separately, is mounted on the camera.
Figure 3B:
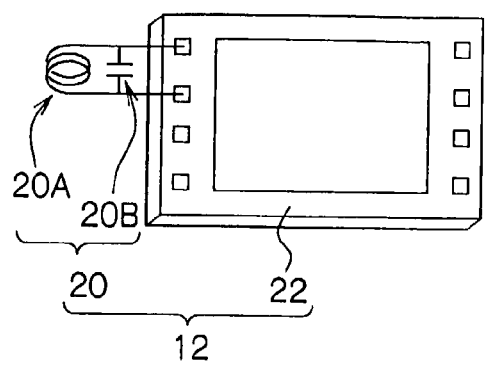
FIG. 3B is a schematic perspective view showing the IC memory for use in the example wherein the IC memory connects with external antenna.

FIGS. 3A and 3B show an example of the IC memory 12, in which the antenna 20 and the IC memory chip 22 are separately formed, mounted on the camera 14, such as the silver halide camera or the DSC. As shown in these figures, the antenna 20 is externally attached to the IC memory chip 22 through wiring 50. In this case, the number of turns, the radius and the material of the antenna coil 20A can be selected to meet specifications. Thus, the optimum antenna and IC can be designed in accordance with a communication distance and the electromagnetic wave intensity of the R/W 18.

The attaching positions of the IC memory chip 22 and the antenna 20 can be freely arranged as long as the operations and optical functions of the camera 14 are not affected. In addition, although FIGS. 3A and 3B show a case of attaching the IC memory chip 22 and the antenna 20 onto the surface of the body of the camera 14, the present invention is not restricted this case, but the IC memory chip 22 and the antenna 20 may be embedded in a part of the camera body or packaged on a circuit board inside the camera body, for example.

Figure 4A:
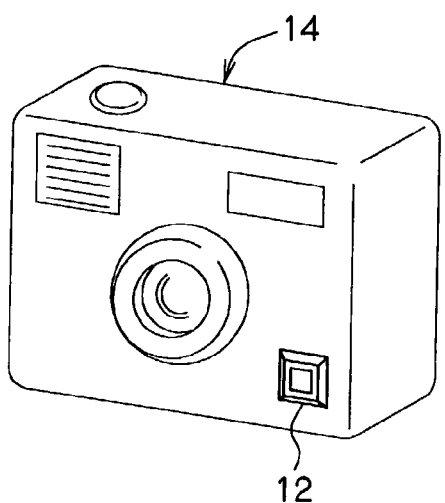
FIG. 4A is an external view of a camera in an example wherein the IC memory in which an antenna is formed by on-chip implementation is mounted on the camera.
Figure 4B:
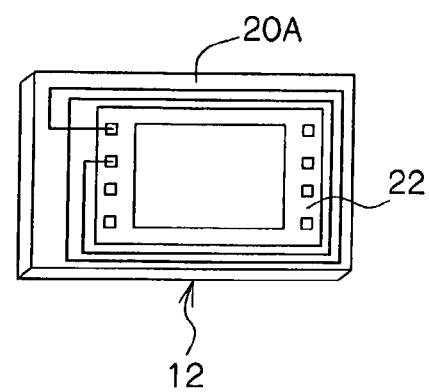
FIG. 4B is a schematic perspective view showing the IC memory for use in the example wherein the IC memory, which has a system on chip antenna.

FIGS. 4A and 4B show such an example of the IC memory 12 in which the antenna 20 is formed on the IC memory chip 22 by on-chipping, is mounted on the camera 14. In this case, the wiring 50 between the antenna 20 and the IC memory chip 22 becomes unnecessary, and a space required for mounting the IC memory 12 on the camera 14 can be made small. Another benefit of this case is that the antenna coil 20A is less liable to be disconnected, or the like.

Although FIGS. 4A and 4B show a case of mounting the IC memory 12 on the surface of the camera body of the camera 14, the present invention is not restricted to this case, the IC memory 12 may be embedded in a part of the camera body or packaged on a circuit board inside the camera body, for example. Moreover, in the case of the DSC, the IC memory 12 may be packaged on the memory, which serves as the image recording medium 16 for recording the image data.

Figure 5A:
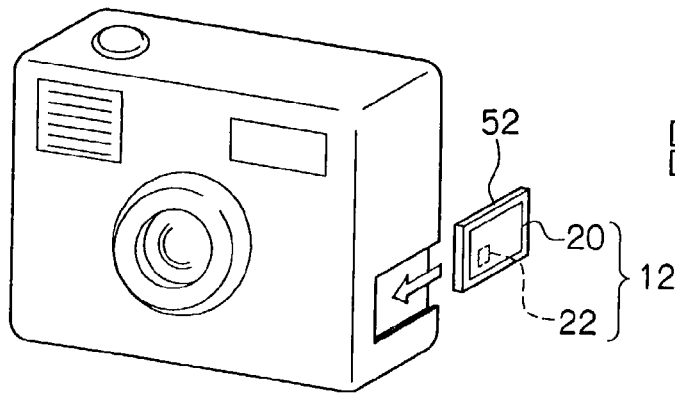
FIG. 5A is an external view of a camera in an example wherein the IC memory formed in the shape of an IC card is mounted on the camera.
Figure 5B:
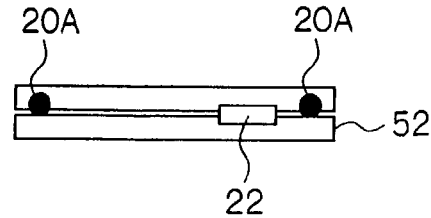
FIG. 5B is a schematic sectional view showing the IC memory (IC card) for use in the example wherein the IC memory chip 22 and an antenna 20A formed in the IC card shape.

FIGS. 5A and 5B show such an example wherein the IC memory chip 22 and the antenna 20 are formed on the same card 52, in other words, the IC memory 12 is shaped into a so-called "IC card", which is freely mountable on and demountable from the camera 14. In this case, after data have been read at the counter of an agency or a photo lab to place an order for printing, the IC memory 12, which is in the shape of the IC card storing individual information, in other words, the card 52, can be drawn out and reused. Moreover, since a general-purpose IC card can be utilized as the IC memory 12 of the IC card shape, the IC memory 12 itself and a printing system utilizing the IC memory 12 can be inplemented at low cost.

FIG. 6 shows an example wherein the IC memory 12 is mounted on the base of a film 16A, which is employed as the image recording medium 16 of the silver halide camera. Since the IC memory 12 is small in size and requires neither a battery nor external wiring, it exhibits a high resistance to adverse environmental conditions. It is accordingly possible to be applied to even in the case of wet film developing process, and no obstacles are formed by mounting the IC memory 12 on the film. In particular, this mounting example is effective for a 135 size film whose patrone is not returned after developing, in a conventional printing system.

The IC memory 12, in which the antenna 20 is formed on the same IC substrate as the IC memory chip 22, is suitable for the mounting on the base of the film 16A.

FIGS. 7A and 7B show an example of the IC memory 12 wherein the antenna 20, which is formed on the IC memory chip 22 by the on-chipping is mounted on an housing member 16B, such as cartridge or patrone, which encases the base of a film 16A employed as the image recording medium 16 of the silver halide camera. In this case, it is easy to appropriately set the distance, direction etc. of the IC memory 12 relative to an electromagnetic wave from the R/W 18. In particular, this mounting example is effective for a so-called "APS film" which is returned together with the housing member 16B after developing, in a conventional printing system.

The mounting position of the IC memory 12 is not especially restricted as long as the housing member 16B can be loaded into the camera 14 without damage. The mounting posiiton may be the side surface of the housing member 16B (refer to FIG. 7A), or the peripheral surface thereof (refer to FIG. 7B). In addition, the IC memory 12 in which the antenna 20 is formed on the IC memory chip 22 by the on-chipping is suitable for the mounting on the housing member 16B of the film 16A.

FIGS. 8A and 8B show an example of the IC memory 12 being mounted on a memory card 16C, which is employed as the image recording medium 16 of the DSC. In this case, the IC memory 12 can be assembled into a card at the same step as the step of packaging a flash memory or another large-capacity memory chip of the memory 16C for recording the images. In addition, since the memory 16C is integrated with the IC memory 12, troublesome operations for the memory 16C, such as identification, retrieval, preservation and categorizing, can be eliminated.

The type of the memory 16C is not especially restricted: this memory 16C may be card-shaped (refer to FIG. 8A) or stick-shaped (refer to FIG. 8B), for example. Moreover, in the mounting on the memory 16C, the IC memory 12, in which the antenna 20 is formed separately from the IC memory chip 22 and is externally attached to the IC memory chip 22 through wiring, or the IC memory 12, in which the antenna 20 is formed on the IC memory chip 22 may be applied.

Figure 9:
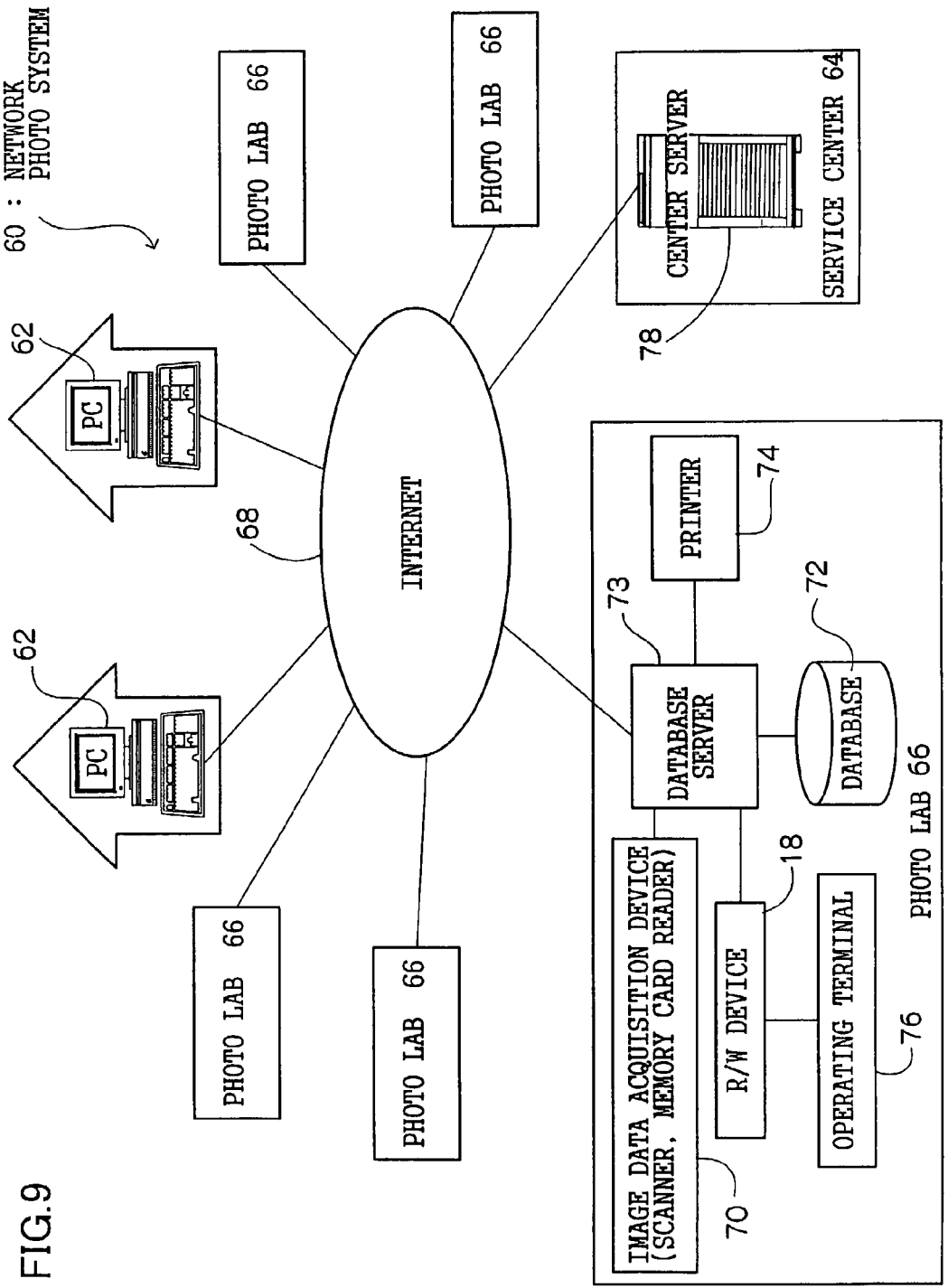
FIG. 9 views an example of a structure of a network photo system.

[Example of Network Photo System] Next, an example of a network photo system, which prints photographs taken by the above camera system, will be described. As shown in FIG. 9, the network photo system 60 is constructed by interconnecting: computers (PC) 62, which are installed in normal homes, offices, and the like, and are operated by customers as terminal devices; service centers 64, which receive various orders placed by the customers, and laboratories 66, which are located in various districts; are interconnected via a network 68, such as the Internet. The service center 64 and the laboratories 66, which perform lots of communications, in particular, should preferably be capable of rapidly processing larger numbers of orders by using high-speed lines.

The following items are installed in the laboratories 66, in order to build a printing system: an image data acquisition device 70, which acquires image data as an image data acquisition component; a large capacity database 72, which stores the acquired image data as a storage component; a database server 73, which manages the storage of the image data in the database 72 and the stored image data; a printer 74, which prints an image, based on the image data, on recording paper or the like: a reader and writer (R/W) 18, which reads/writes various information items from/into an IC memory 12; and an operating terminal 76, which serves to input instruction information and information to-be-written to the R/W 18. The image data acquisition device 70, the printer 74, the database 72 and the R/W 18 are respectively connected with the database server 73.

The image data acquisition device 70 includes a scanner, which acquires the image data by reading each frame image of a film 16A, a memory reader, which reads out the image data recorded in a memory 16C, and the like.

The R/W 18 is installed at the counter of the photo lab 66, and is connected with the operating terminal 76, which a clerk or the customer, who has come to the photo lab 66, operates to input the instructing information and information to-be-written for the R/W 18. Thus, the clerk or the customer can write various information items, such as individual information and order information, into the IC memory 12 merely by bringing the IC memory 12, which is mounted on a camera 14 or an information recording medium 16 and brought in by the customer, close to the R/W 18 and then operating the operating terminal 76 so as to input the write instructing information and the information to-be-written. Moreover, various information recorded in the IC memory 12 can be read out by the R/W 18, merely by the clerk or the customer inputting the read instructing information from the operating terminal 76 and then bringing the IC memory 12 close to the R/W 18.

As an example of the operating terminal 76, a POS (Point Of Sales) system, an automatic vending machine or the like can be used.

The database server 73 adds, as identification information, the information read out of the IC memory 12 by the R/W 18 to the image data, which was acquired by the image data acquisition device 70, and registers the resulting image data in the database 72. That is, the image data are stored in the database 72 in accordance with the information read out by the R/W 18, in other words, the image date is arranged into groups of every identification information.

Besides, the database server 73 generates image data of low resolution (a thumbnail image) from the image data acquired by the image data acquisition device 70. The thumbnail image is transferred to a central server 78, which is installed in the service center 64 as a server.

The central server 78 receives, via the network 68, order information for printing from the PC 62 and transmits, based on the order information, the print instructing information for the image data for which printing was ordered, to the photo lab 66, which is designated by the received order information, to perform the printing. At this time, the central server 78 keeps the thumbnail images transferred from the individual laboratories 66, in association with the laboratories 66 of transfer sources, and it makes the thumbnail images accessible on the network 68 so as to accept orders for printing by the customers by utilizing the thumbnail images. More specifically, the customer confirms the thumbnail image of his/her photograph and places an order for printing for, for example, an additional copy or downloads the image data by the PC 62 through the network 68. The central server 78 inquires whether each customer is the customer corresponding to the image data using an authentication based on a password, or the like, in order to prevent others from seeing the thumbnail images of the photographs of the particular customer, thereby limiting the thumbnail images that each customer can watch. When the photo lab 66, which is designated to perform the printing differs from the photo lab 66, whose database 72 stores the ordered image data, the central server 78 also instructs the data storing photo lab 66 to transfer the image data to the designated photo lab 66.

The network photo system 60 stated above has been mentioned as one example. The present invention is not restricted thereto: any network photo system maybe constructed as long as it can accept an order for printing image data stored in the database 72, from the terminal device (PC) through the network, and then perform the printing. Above, for example, orders directed toward each of the laboratories 66 are collectively accepted by the central server 78. However, a server apparatus may be installed in each of the laboratories 66, whereby at each photo lab 66, orders for printing the image data stored in the database 72 of the photo lab are accepted by the server apparatus installed at the photo lab.

[Operation]

Next, the operation of this embodiment will be described. First described the job flow of the whole photo system, which is built using the camera system 10 will be described. In the following description, an example where the IC memory 12 is mounted on a film, which has a lens attached thereto, (disposable camera) of the type, which is sold in a state where a film is pre-loaded in a camera that is delivered to a photo lab after photographing, in order to develop the film and to place an order for printing, will be explained.

Figure 10B:
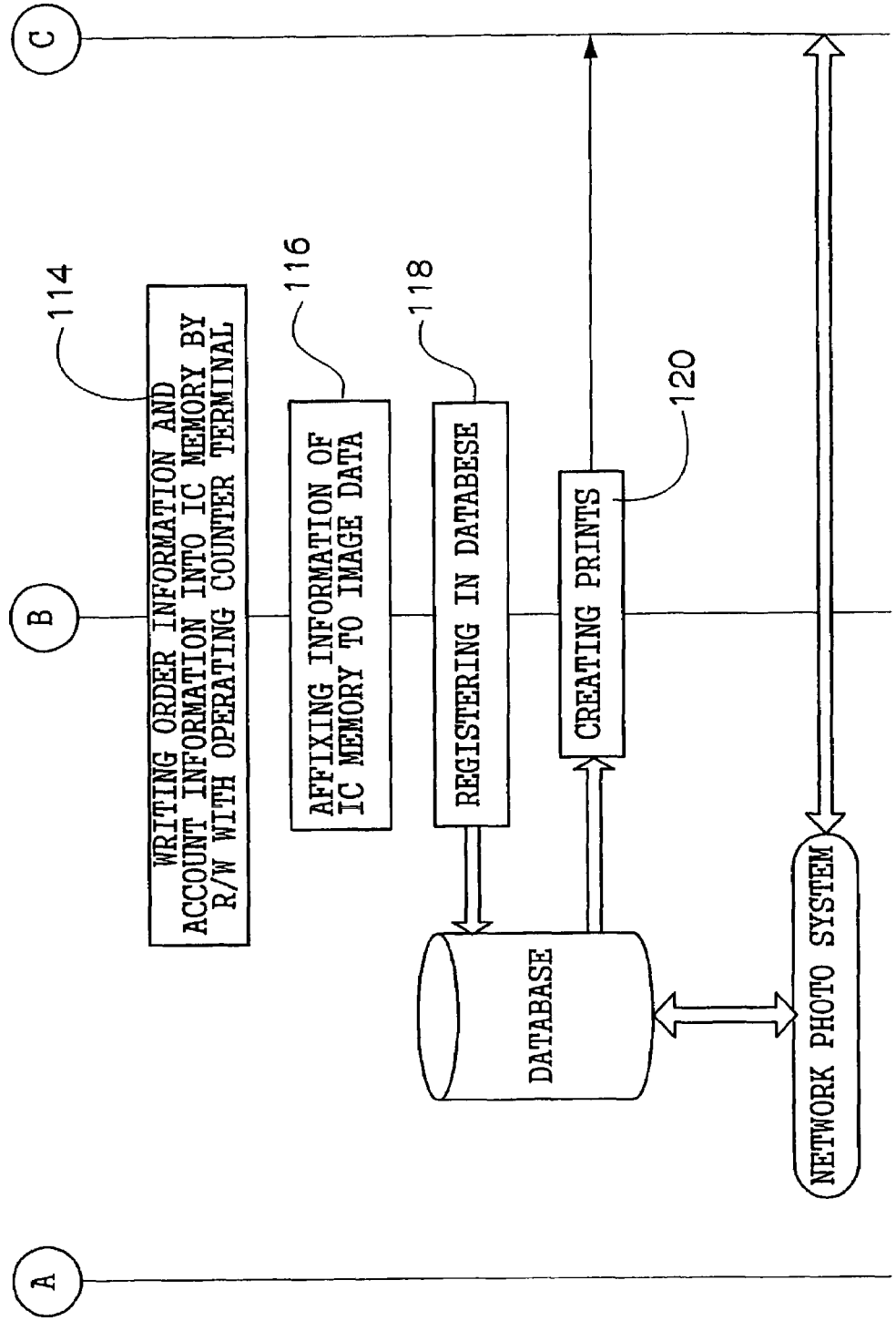
FIG. 10B views the job flow of a factory, a photo lab and a customer to explain the operation of the whole photo system.
Figure 11A:
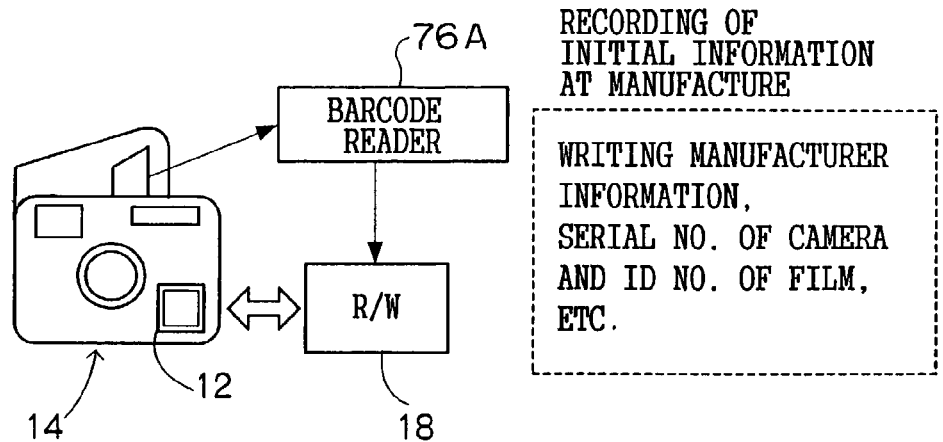
FIG. 11A is a conceptual diagram of writing information into the IC memory in a camera assembly process.

As shown in FIGS. 10A and 10B, in a camera assembly process in a factory or the like, the IC memory 12 is mounted on the camera 14 (step 100), manufacturer information such as the type of the camera 14 and the type of the image recording medium 16 (especially, the silver halide film) are written, as initial information, into the mounted IC memory 12 by the R/W 18 (step 102), and the finished camera is then shipped (step 104). Specifically, as shown in FIG. 11A, in the camera assembly process, a product (serial) no., the ID no. of the film in the case of the silver halide camera, and the like, are read out using, for example, a barcode reader 76A, are recorded in the IC memory 12 as manufacturer information by the R/W 18.

Figure 11B:
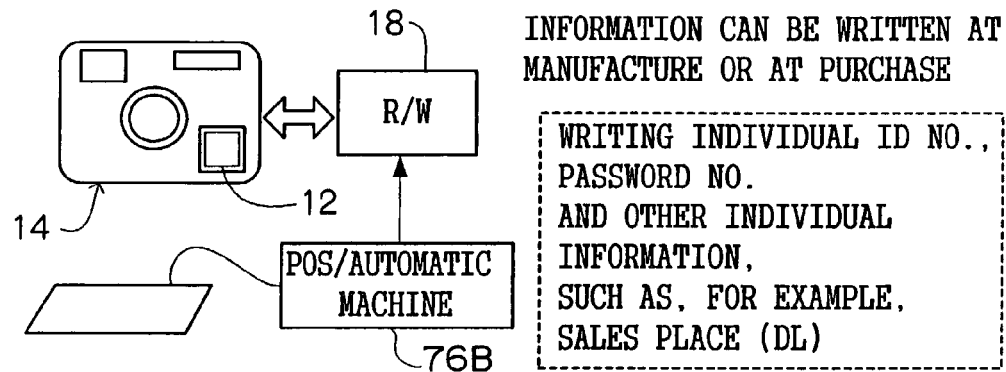
FIG. 11B is a conceptual diagram of writing information into the IC memory at a time the camera is purchased.

The shipped camera 14 is sold at the photo lab 66 or a store (step 106). Then, when the camera 14 is purchased by a customer (step 108), individual information required to place an order for printing is written into the IC memory 12 (step 110). Specifically, as shown in FIG. 11B, when the camera 14 is purchased, a clerk or the customer, for example, operates the operating terminal 76 (for example, a POS (Point Of Sale system) 76B) installed at the counter of the photo lab 66 (or the store), and records as the individual information an individual ID, a password no., etc. in the IC memory 12.

The telephone no. of an ordinary telephone (a telephone connected with a telephone line by a wire), the telephone no. of a portable telephone, the electronic mail address of a portable telephone (for exchanging electronic mail items with wireless communication by a portable telephone), the electronic mail address of a PC (for exchanging electronic mail items by a PC connected with a network), or the like can be used as the individual ID. These individual ID's make it possible to callback a customer with a telephone call or an electronic mail. For example, when the customer has placed the order for printing images by utilizing the printing system of the photo lab 66 or the network photo system 60, a message (vocal message or text message), which indicates an acknowledgment of the acceptance of the order, the date the prints will be received, the estimated charge, and the like, can be transmitted from the central server 78 to the customer, who has placed the order.

At this time, information on a place where the camera 14 was sold (or purchased) may be recorded as additional information. For example, for a sight-seeing location, the name of the sight-seeing location is recorded as comment information, or a logo or character particular to the sight-seeing location can be recorded. The additional information may be utilized for image management by the customer, or may well be selectively added to images when printing the images, in the network photo printing system to be described later.

Figure 11C:
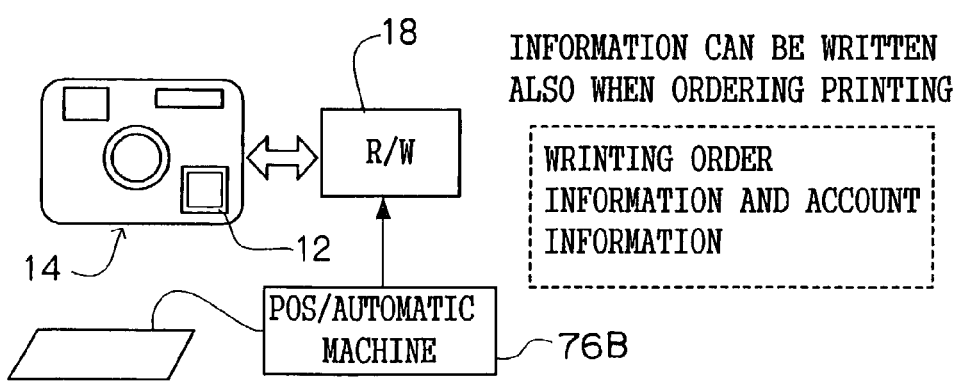
FIG. 11C is a conceptual diagram of writing information into the IC memory at a time of an order for printing.

Thereafter, the customer takes photographs with the purchased camera 14 (step 112). When the customer wants to place the order for printing the images of the photographs, he/she carries the camera 14 and the image recording medium 16 to the nearest photo lab 66 (or camera stores, photograph shops, and the like). When the image recording medium 16 is delivered to the photo lab 66 to order the printing, the order information is written into the IC memory 12 (step 114). Specifically, as shown in FIG. 11C, at the order for printing, the clerk or the customer, for example, operates the operating terminal 76 (for example, POS 76B) installed at the counter of the photo lab 66, to record as the order information, an address, a name, a telephone no., a number of prints, other desired conditions, and the like, in the IC memory 12.

The information related to the individual customer, such as the address, the name and the telephone no., may be recorded in the IC memory 12 as the individual information when the camera is purchased, as explained above. In addition, a credit card no., the charge, etc. may be recorded in the IC memory 12 as account information to permit so-called "electronic accounting" by a credit card or a CPU within the IC memory 12.

At the photo lab 66, the information recorded in the IC memory 12 is affixed to the image data of the image recording medium 16 accepted from the customer (step 116), and the resulting image data is stored in the database 72 (step 118). Then, at the photo lab 66, the prints are made, from the image data stored in the database 72, by the printer 74 and are delivered to the customer (step 120).

Next, process, from the customer carrying the camera used for photographing to the photo lab in order to place the order for printing, to linking the camera to the network photo system, will be described in detail with reference to FIGS. 12A and 12B.

Figure 12A:
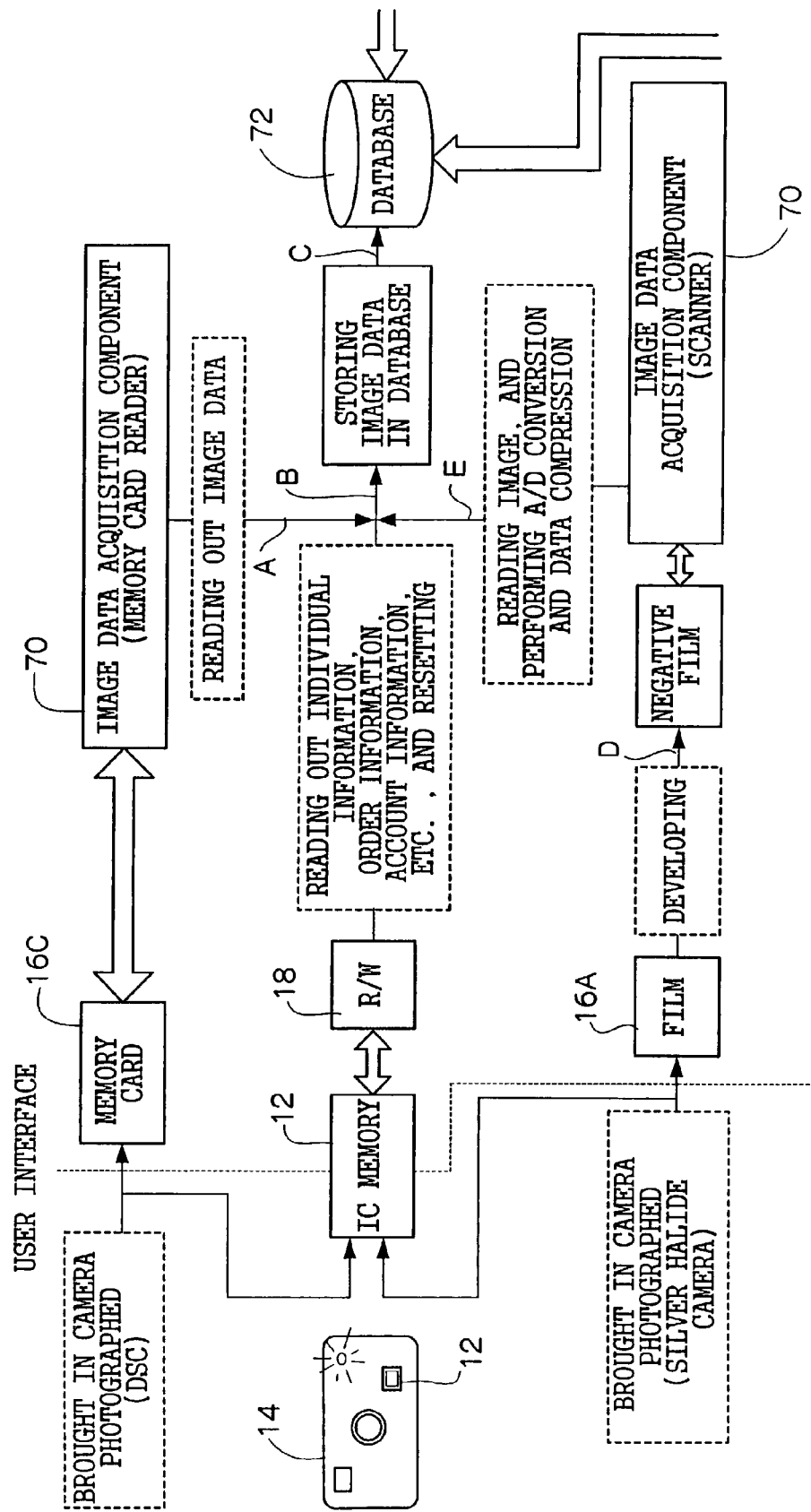
FIG. 12A is a conceptual diagram for explaining steps from the customer carrying the camera subjected to photographing, to the photo lab until the camera is linked to the network photo system.

As shown in FIGS. 12A and 12B, in a case where the customer has taken photographs with the DSC, the DSC or the memory card 16C are carried to the photo lab 66. At the photo lab 66, the image data is read out from the camera 14 or the memory card 16C, by the image data acquisition device 70 (memory reader) (arrow A). Also, information, which is recorded in the IC memory 12 mounted on the camera 14 or on the memory 16C of the camera 14, that is, manufacturer information, identification information (individual information, order information, and account information) and additional information, are read out by the R/W 18, and then all or part of the recorded contents of the IC memory 12 are reset (refer to arrow B), whereupon the camera 14 or the memory card 16C are returned to the customer. Then, the information read out of the IC memory 12 is affixed to the read out image data, and the resulting image data is stored in the database 72 (arrow C). The image data is usually compressed with a JPEG format, or the like, to be stored in the memory 16C.

When in a case where the customer has taken photographs with the silver halide camera, the camera 14, which has the IC memory 12 attached thereto, is delivered to the photo lab 66 as it is. At the photo lab 66, the film 16A developed (arrow D). The developed film (negative film) is read by the image data acquisition device 70 (scanner) so as to acquire image data, and the image data is digitized and then subjected to signal compression (for example, JPEG compression) (arrow E). Moreover, as in the case of the DSC, information, which is recorded in the IC memory 12 mounted on the camera 14 or the film 16A, is read out by the R/W 18, and the recorded contents of the IC memory 12 are reset (refer to arrow B). Further, as in the case of the DSC, the information, which is read out of the IC memory 12, is affixed to the compressed image data, and the resulting image data are stored in the database 72 (arrow C).

In the case of the DSC, the image data may be downloaded directly from a flash memory or the like, which is disposed as the image recording medium 16 inside the camera, via an external output terminal. In addition, when a memory, which is demountable from the camera, is employed as the image recording medium 16 and has the IC memory 12 mounted thereon, the customer need carry only the demounted memory to the photo lab 66.

In the case of the silver halide camera, when the IC memory 12 is mounted on the film 16A being the image recording medium 16, the customer need carry only the image recording medium 16 to the photo lab 66. At this time, in the case where the IC memory 12 is mounted on the base of the film, the information may be read out from the IC memory 12 after the developing of the film.

Thereafter, at the photo lab 66, the printer 74 is operated on the basis of the image data stored in the database 72, and makes prints based on the image data, and the customer receives the print output results by paying a charge (refer to arrow F).

In general, an image obtained by photographing with the silver halide camera differs from an image picked up by the DSC, in such characteristics as granularity, γ-characteristic, dynamic range and color balance. Besides, these characteristics differ depending upon the type (model) of the silver halide camera and the type of the silver halide film used, even in the case of the silver halide camera, and they also differ depending upon the type (model) of the DSC in the case of the DSC.

Great differences may occur between finished prints from a photographed subject or photographing conditions. For example, in case of photographing against the light with a bright background, corrections need to be made so that a subject does not collapse when the image is printed. Reproduction of an appropriate white balance and natural colors, which depends upon the types of light sources when photographing: natural light, a fluorescent lamp, using a flash source, etc. Print creation conditions are determined on the basis of photographing information thus recorded in the IC memory 12 in addition to information obtained from the image data, whereby the optimum printing conditions can be set.

In the printer 74, therefore, to execute the printing, not only the information hitherto obtained from the image data, but also the information related to the photographing conditions, the types of the camera or the image recording medium indicated in the manufacturer information, is read out of the IC memory 12, affixed to the image data to-be-printed, stored in the database 72, and used to set print output conditions, which conform to the different characteristics mentioned above.

For example, exposure conditions for print paper such as photographing paper or printing paper, and print output conditions such as color balance, are set in accordance with the differences of the characteristics, and the image data is subjected to imaging, which corresponds to the print output conditions, whereupon the printing is executed. Moreover, for example, the type of print paper to be used maybe set (selected), as the printing output condition, in accordance with the differences of the characteristics, and the image printed on the set print paper. Thus, a print output result, in other words, an image quality, can be guaranteed irrespective of the type of the camera or the image recording medium.

Moreover, when, at this time, the image data is stored in the database 72, it becomes possible to utilize the network photo system 60, and it is possible to transfer the image data, via the network 68, to the photo lab 66, which is different from the photo lab 66 to which the customer carried the camera, and to perform the printing at the different photo lab 66. That is, the customer can designate the photo lab 66, which is different from the photo lab 66 to which he/she carried the camera and placed an order for printing, as the photo lab 66, which performs the printing.

In addition, the image data remains in the database 72 even after the printing is outputted. Therefore, an order for an additional copy or the like, which is inputted by the customer by operating the PC 62 at his/her house or company, can be accepted by the network photo system 60 to print the image data at the photo lab 66 designated in the order (refer to arrow G). At a later date, a printed result can be given to the customer coming to the designated photo lab 66, or can be delivered to a place designated by the customer (for example, a convenience store).

Thus, according to this embodiment, the IC memory 12 is mounted on the camera 14 or the image recording medium 16, whereby when ordering printing, identification information items such as individual information, order information and account information, need not be entered by hand, so that an order blank, a slip or the like become unnecessary permitting paperless operations, and reducing the task of a clerk or the customer. Moreover, the print service can be offered to customers by employing the same interface irrespective of the types of the cameras, such as the silver halide camera and the DSC and the types of the image recording media.

Moreover, the information items (manufacturer information, identification information, and additional information), which is readout from the IC memory 12, is affixed to the image data, and the resulting image data are unitarily managed by the database 72, preventing that the image data and the various information of the IC memory 12 from becoming scattered. At this time, even in the case of the silver halide camera, the image data and the individual information and order information can be unitarily managed by digitizing the image data, in which database is common as in the case of the DSC.

When the image data and the various information items such as identification information are handled based on the same database, the associated management of the image data and the customers is facilitated, and the paperless operations are possible as stated above, so that the network photo system 60 can be easily accessed. That is, each customer is permitted to access the image data of his/her photographs through the network 68, and he/she can effectively utilize his/her own image data.

Thus, the customer can place an order for printing, for example, the additional copy of his/her photograph, from the PC 62 by operating the PC 62 and utilizing the network photo system 60, without going to the photo lab 66. Moreover, in the case where the customer operates the PC 62 to use the network photo system 60, he/she need not input the individual information again, and he/she may merely select desired image data and input order information.

Even a customer who cannot use the PC 62 can utilize the network photo system 60 by going to the nearest photo lab 66 and placing an order for an additional copy or the like. In this case, even if the customer gives the order at the photo lab 66, which is different from the photo lab 66 where he first placed an order for printing, the image data of the particular customer can be sent from the other photo lab 66 to the different photo lab 66 by utilizing the network photo system 60 (the image data can be transferred through the network 68), and printed. That is, whichever photo lab 66 is utilized, the order for printing the additional copy, or the like, can be placed without carrying the memory, the developed film, or the like, to the photo lab 66, as in the prior art.

Since image data are stored in the database 72 in a compressed state, a large quantity of image data can be stored. Also, in the case where, owing to the link with the network photo service, the image data are transferred in order to print them at the different photo lab 66, because the different photo lab 66 has been designated for receiving the printed result, a network traffic volume may be small, and the large quantity of image data can be transferred at high speed.

Although an example of a case where the dedicated R/W 18 is installed at each photo lab 66 and where the various information, such as manufacturer information, identification information and additional information is written into the IC memory 12 by the R/W 18 has been given above, the present invention is not restricted thereto. Since the IC memory 12 conforms to digital data, these information items can also be written by, for example, a portable telephone.

Figure 13:
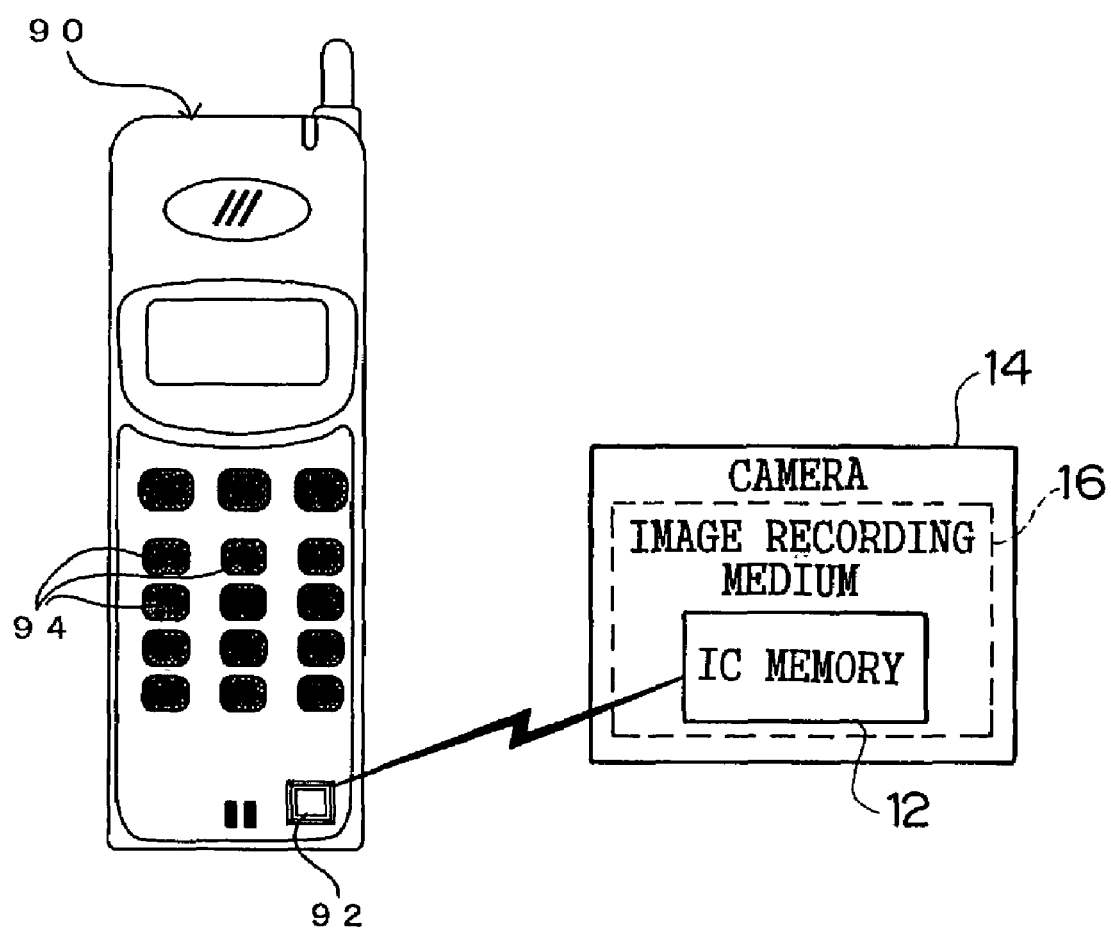
FIG. 13 is a constructional view of a cellular phone which reads/writes information from/into the IC memory.

As shown in FIG. 13, this can be incarnated by mounting a reader and writer 92 on the portable telephone 90. The reader and writer 92 is constructed to have a controlling circuit board which includes a CPU, an RF circuit, etc., and an antenna, and it communicates with the IC memory 12 in a contactless state so as to write/read information into/from the IC memory 12. Incidentally, with the portable telephone 90, data to be written into the IC memory 12 is inputted by operating (depressing) ten-keys 94. Moreover, in the case of employing the portable telephone 90, the telephone no. of this portable telephone 90 or the electronic mail address of this portable telephone 90 (for exchanging electronic mail via wireless communications by the portable telephone 90) may be automatically written into the IC memory 12 as the individual ID. In this case, the input job of the individual ID by the operation of the ten-keys 94 becomes unnecessary, and the task of the customer can be reduced.

Besides, in recent years, a portable telephone, which can be wireless-connected to a network, such as the Internet, has also been put into practical use, and a customer can use the network photo system 60 by the portable telephone instead of the PC 62.

What is claimed is:

1. A digital camera system comprising:
    a digital camera, which photographs a subject;
    an image recording medium, which records an image of the photographed subject; and
    an information recording component, which is removably mounted on an outside of a casing of the digital camera and into and out of which information other than the image can be written and read, based on an external signal sent from an exterior of the digital camera system,
    wherein the information recording component includes an IC memory chip and includes a contactless communication component which communicates with the exterior in a contactless state, and
    wherein the contactless communication component and the IC memory chip are integrated on a same chip.

2. The digital camera system of claim 1, wherein the contactless communication component communicates with a portable telephone.

3. The digital camera system of claim 2, wherein the information recording component writes into and reads out information other than the image based on one or more signals from the portable phone.

4. The digital camera system of claim 3, wherein the information other than the image and the one or more signals are generated by one or more keys of the portable phone being operated.

5. The digital camera system of claim 1, wherein the IC memory chip includes a memory cell, which is selected from a group comprising consisting of a semiconductor nonvolatile memory, a ferroelectric memory and a magnetic memory.

6. The digital camera system of claim 1, wherein the image recording medium is one of a memory and a silver halide film.

7. The digital camera system of claim 1, wherein the image recording medium and the information recording component are separate.

8. The digital camera system of claim 1, wherein the information recording component includes a power circuit configured to generate power from electromagnetic waves.

9. A digital camera device for photographing a subject, the camera device comprising an information recording component being removably mounted on an outside of a casing of a main body of the digital camera device, into and out of which information other than an image of the photographed subject can be written and read, based on an external signal, wherein the information recording component includes an IC memory chip and includes a contactless communication component which communicates with the exterior in a contactless state, and wherein the contactless communication component and the IC memory chip are integrated on a same chip.

10. The digital camera device of claim 9, wherein the information recording component includes a contactless communication component, which communicates with an exterior in a contactless state.

11. The digital camera device of claim 10, wherein the information recording component includes a power circuit configured to generate power from electromagnetic waves.

12. The digital camera device of claim 10, wherein the camera device is configured to record the photographed image in an image recording medium, wherein the image recording medium and the information recording component are separate.

13. A printing system comprising:

a printer, which prints an image photographed by a digital camera system including a digital camera device that photographs a subject, an image recording medium that records an image of the photographed subject, and an information recording component that is removably mounted on an outside of a casing of the digital camera device, and that can have information other than the image written thereinto and read therefrom, based on an external signal;

a readout component, which reads out the information written in the information recording component;

an image acquisition component, which acquires image data from the image recording medium; and a storage component, which stores the image data acquired by the image acquisition component, together with the information read out of the information recording component by the readout component, wherein the information recording component includes an IC memory chip and a contactless communication component, which communicates with an exterior in a contactless state.

wherein the contactless communication component and the IC memory chip are integrated on a same chip.

14. The printing system of claim 13, wherein when the image data is analog data, the analog data is converted into digital data, and stored in the storage component.

15. The printing system of claim 13, wherein the image data are converted into data of an identical standard irrespective of a type of the camera, and then stored in the storage component.

16. The printing system of claim 13, wherein the image data is subjected to data compression and then stored in the storage component.

17. The printing system of claim 16, wherein the data compression conforms to a JPEG standard.

18. The printing system of claim 13, wherein:

the information comprises information, which indicates at least one of a type of the camera device, a type of the image recording medium, and a photographing condition, and the printer sets a printing output condition for printing the image, based on the information, which indicates at least one of the type of the camera device, the type of the image recording medium, and the photographing condition.

19. The printing system of claim 13, wherein the contactless communication component communicates with a portable phone, and the information recording component writes into and reads out information other than the image based on one or more signals from the portable phone.

20. The printing system of claim 19, wherein the information other than the image and the one or more signals are generated by one or more keys of the portable phone being operated.

21. The printing system of claim 13, wherein the image recording medium and the information recording component are separate.

22. The printing system of claim 13, wherein the information recording component includes a power circuit configured to generate power from electromagnetic waves.

23. A server apparatus connected to a printing system through a network, wherein the printing system includes:

a printer, which prints an image photographed by a digital camera system including a digital camera device that photographs a subject, an image recording medium that records an image of the photographed subject, and an information recording component that is removably mounted on a casing of a main body of the digital camera device, and that can comprise information other than the image written thereinto and read therefrom based on of an external signal;

a readout component, which reads out the information written in the information recording component;

an image acquisition component, which acquires image data from the image recording medium; and a storage component, which stores the image data acquired by the image acquisition component together with the information that is read out of the information recording component by the readout component;

wherein the server apparatus receives order information, which orders the printing of the image and is transmitted from a terminal device via the network, and the server apparatus transmits instructing information, which instructs the printing system to execute the printing based on the received order information, wherein the information recording component includes an IC memory chip and includes a contactless communication component which communicates with the exterior in a contactless state, and wherein the contactless communication component and the IC memory chip are integrated on a same chip.

24. The server apparatus of claim 23, wherein the information comprises information, which can transmit a message to a printing orderer, and the server apparatus transmits the message to the printing orderer using the information capable of the transmission.

25. The server apparatus of claim 23, wherein the information recording component comprises a contactless communication component, which communicates with an exterior in a contactless state.

26. The server apparatus of claim 25, wherein the contactless communication component communicates with a portable phone, and the information recording component writes into and reads out information other than the image based on one or more signals from the portable phone.

27. The server apparatus of claim 26, wherein the information other than the image and the one or more signals are generated by one or more keys of the portable phone being operated.

28. The server apparatus of claim 19, wherein the information recording component includes a contactless communication component, which communicates with an exterior in a contactless state.

29. The server apparatus of claim 28, wherein the information recording component includes a power circuit configured to generate power from electromagnetic waves.

30. The server apparatus of claim 28, wherein the camera device is configured to record the photographed image in the image recording medium, wherein the image recording medium and the information recording component are separate.

31. A digital camera device for photographing a subject, the digital camera device comprising:
- an antenna mounted on a main body of the digital camera device; and
- an information recording component being separately mounted on the main body of the camera device, into and out of which information other than an image of the photographed subject can be written and read, based on an external signal through the antenna;
- wherein the information recording component includes an IC memory chip and includes a contactless communication component which communicates with the exterior in a contactless state, and
- wherein the contactless communication component and the IC memory chip are integrated on a same chip.

32. The camera device of claim 31, wherein the digital camera device is configured to record the photographed image in an image recording medium, wherein the image recording medium and the information recording component are separate.

33. A removable non-volatile digital memory, which is used in a digital camera for photographing a subject and records an image of the photographed subject, the removable non-volatile digital memory being mounted on a casing of the camera and comprising:
- an information recording component mounted on the removable non-volatile digital memory, into and out of which information other than the image of the photographed subject can be written and read, based on an external signal, wherein
- the information recording component is an IC memory chip and includes a contactless communication component, which communicates with the exterior in a contactless state, and
- the contactless communication component and the IC memory chip are integrated on a same chip.

34. The removable non-volatile digital memory of claim 33, further comprising:
- an antenna for the information recording component mounted on the removable non-volatile digital memory, wherein the antenna is formed separately from the IC memory chip and connected to the IC memory chip through wiring.

35. The removable non-volatile digital memory of claim 33, further comprising:
- an antenna for the information recording component mounted on the removable non-volatile digital memory, wherein the antenna is integrally formed with the IC memory chip.

* * * * *